(12) United States Patent
Hara

(10) Patent No.: US 8,354,764 B2
(45) Date of Patent: Jan. 15, 2013

(54) SURFACE MOUNT MOTOR

(75) Inventor: Kentaro Hara, Itabashi-ku (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 13/117,002

(22) Filed: May 26, 2011

(65) Prior Publication Data

US 2011/0291510 A1 Dec. 1, 2011

(30) Foreign Application Priority Data

May 31, 2010 (JP) ................................. 2010-124657

(51) Int. Cl.
*H02K 5/04* (2006.01)
*H02K 15/14* (2006.01)
*H02K 7/075* (2006.01)
(52) U.S. Cl. ........................................... 310/81; 310/91
(58) Field of Classification Search .................... 310/81, 310/91
See application file for complete search history.

(56) References Cited

U.S. PATENT DOCUMENTS

| | | | | |
|---|---|---|---|---|
| 4,163,913 A | * | 8/1979 | Barratt | 310/91 |
| 6,081,055 A | * | 6/2000 | Narusawa | 310/81 |
| 6,133,657 A | * | 10/2000 | Semenik et al. | 310/81 |
| D574,324 S | * | 8/2008 | Hara et al. | D13/112 |
| 7,567,002 B2 | * | 7/2009 | Takagi et al. | 310/81 |
| D603,795 S | * | 11/2009 | Kono | D13/122 |
| 7,619,335 B2 | * | 11/2009 | Suzuki et al. | 310/81 |
| 7,679,240 B2 | * | 3/2010 | Kono | 310/81 |
| 7,825,555 B2 | * | 11/2010 | Uchiumi et al. | 310/81 |
| 7,888,832 B2 | * | 2/2011 | Masato | 310/81 |
| 8,013,486 B2 | * | 9/2011 | Umehara et al. | 310/81 |
| 2009/0051238 A1 | * | 2/2009 | Umehara et al. | 310/91 |
| 2011/0241464 A1 | * | 10/2011 | Kadowaki et al. | 310/81 |
| 2011/0291509 A1 | * | 12/2011 | Hara | 310/91 |
| 2011/0291510 A1 | * | 12/2011 | Hara | 310/91 |

FOREIGN PATENT DOCUMENTS

| | | |
|---|---|---|
| JP | 11-234943 | 8/1999 |
| JP | 2008271769 | * 11/2008 |

OTHER PUBLICATIONS

Machine translation of Chou, Wan-Shu, JP 2008271769, "Socket for Supporting Motor, and Vibration Motor Equipped With the Socket", Nov. 6, 2008.*

* cited by examiner

*Primary Examiner* — Tran N. Nguyen
*Assistant Examiner* — David Scheuermann
(74) *Attorney, Agent, or Firm* — Beyer Law Group LLP

(57) ABSTRACT

A holder of a surface mount motor includes a bottom-raising piece formed so as to extend integrally from the bottom portion and bent at a predetermined bending angle with respect to the bottom portion. When the holder is attached to a motor body, there is a risk that a mounting surface of the bottom portion of the holder will not be in the same plane as a mounting surface of a terminal. In such a case, a fine adjustment may be performed simply by slightly raising or lowering the bottom-raising piece. Thus, an adjustment between the heights of the mounting surface of the bottom portion of the holder and the mounting surface of the terminal can be easily performed. A gap between the bottom portion of the holder and the motor casing can be easily changed simply by changing the bending angle of the bottom-raising piece.

5 Claims, 15 Drawing Sheets

SURFACE MOUNT MOTOR

CROSS REFERENCE TO RELATED APPLICATIONS

The present application claims the benefit of 35 U.S.C. §119 or 35 U.S.C. §365 under 37 C.F.R. §1.55 based on priority to Japanese Patent Application No. 2010-124657, filed May 31, 2010, which is hereby incorporated herein by reference in its entirety.

BACKGROUND OF THE INVENTION

1. Field of the Invention

The present invention relates to a motor suitable for surface mounting on a circuit board.

2. Description of the Related Art

Japanese Unexamined Patent Application Publication No. 11-234943 discloses an example of a technique in this field. A surface mount motor described in this publication includes a motor body and a metal holder frame fixed to the motor body. The motor body is a brush motor and has a substantially columnar drum portion (motor casing). The rear end of the substantially columnar drum portion is closed by an end bracket made of resin. Terminal pieces (terminals) that are mounted on a circuit board and brush terminal pieces that slide with respect to a commutator are fixed to the end bracket. The metal holder frame includes a holder body that is attached to the drum portion of the motor body. The holder body includes a rectangular bottom plate portion which contacts the circuit board and a pair of clamping spring pieces that are bent upward from the long sides of the bottom plate portion and that clamp the substantially columnar drum portion of the vibration motor body. A bulge portion having a trapezoidal shape in cross section is formed on the bottom plate portion of the holder frame at a position corresponding to the center of gravity of the motor body. The drum portion of the motor body is placed on a top surface of the bulge portion, so that the motor body can be stably placed on the holder frame. Cream solder used for mounting the motor is introduced into the bulge portion while the cream solder is in a molten state. Accordingly, the holder frame does not easily become detached from the circuit board.

The bulge portion provided on the bottom plate portion of the holder frame is formed in a trapezoidal shape in cross section by press working. Therefore, there is a risk that the motor body will be inclined depending on the levelness and flatness of the top surface of the bulge portion. The shape accuracy of the bulge portion largely depends on the accuracy of the die used in press working. As the size of the holder frame decreases, it becomes more difficult to use a die having sufficient accuracy. It is necessary that the mounting surface of the bottom plate portion of the holder frame be in the same plane as the mounting surfaces of the terminal pieces. When the mounting surface of the bottom plate portion of the holder frame and the mounting surfaces of the terminal pieces are at different heights, it is difficult to perform a fine adjustment of the heights of the mounting surfaces by deforming the top surface of the bulge portion having a trapezoidal shape in cross section. Thus, in the holder frame according to the related art, it is difficult to adjust the heights of the mounting surface of the bottom plate portion of the holder frame and the mounting surfaces of the terminal pieces.

SUMMARY OF THE INVENTION

An object of the present invention is to provide a surface mount motor with which the heights of a mounting surface of a holder and mounting surfaces of terminals in a motor body can be easily adjusted.

According to an aspect of the present invention, a surface mount motor includes a motor body including a tubular motor casing; a terminal provided on the motor body, the terminal being mounted on a circuit board; and a holder attached to the motor casing of the motor body. The holder includes a bottom portion mounted on the circuit board, and a bottom-raising piece formed so as to extend integrally from the bottom portion, the bottom-raising piece being bent at a predetermined bending angle with respect to the bottom portion.

The holder for the surface mount motor includes the bottom-raising piece formed so as to extend integrally from the bottom portion, the bottom-raising piece being bent at the predetermined bending angle with respect to the bottom portion. When the holder is attached to the motor body, there is a risk that a mounting surface of the bottom portion of the holder will not be in the same plane as a mounting surface of the terminal. In such a case, a fine adjustment may be performed simply by slightly raising or lowering the bottom-raising piece. Thus, an adjustment between the heights of the mounting surface of the bottom portion of the holder and the mounting surface of the terminal can be easily performed. A gap (raising amount) between the bottom portion of the holder and the motor casing can be easily changed simply by changing the bending angle of the bottom-raising piece. In particular, depending on the specification, a weight must be provided on a shaft in the motor body such that the weight does not interfere with the circuit board when the weight rotates. In such a case, it is necessary to increase the raising amount of the motor casing. Also in this case, the raising amount can be easily increased by changing the bending angle of the bottom-raising piece. The bottom-raising piece can be easily formed by a bending process.

Preferably, the bending angle is 180°.

In such a case, a placement surface for receiving the motor casing may be formed on the bottom-raising piece such that the placement surface is parallel to the mounting surface of the bottom portion. Since the placement surface comes into surface contact with the motor casing, the motor body can be stably placed on the holder.

Preferably, the bottom portion has an opening, and the bottom-raising piece is initially formed so as to project into the opening and is bent onto the bottom portion.

In such a case, the raising amount of the motor casing can be set to twice the thickness of the bottom portion. Thus, differences between the raising amounts of holders can be reduced and the raising amounts can be easily set to a uniform value. In addition, the cream solder in a molten state enters the opening, so that the holder is not easily detached from the circuit board.

According to the present invention, an adjustment between the heights of the mounting surface of the holder and the mounting surface of the terminal on the motor body can be easily performed.

DESCRIPTION OF THE PREFERRED EMBODIMENTS

Figure 1:
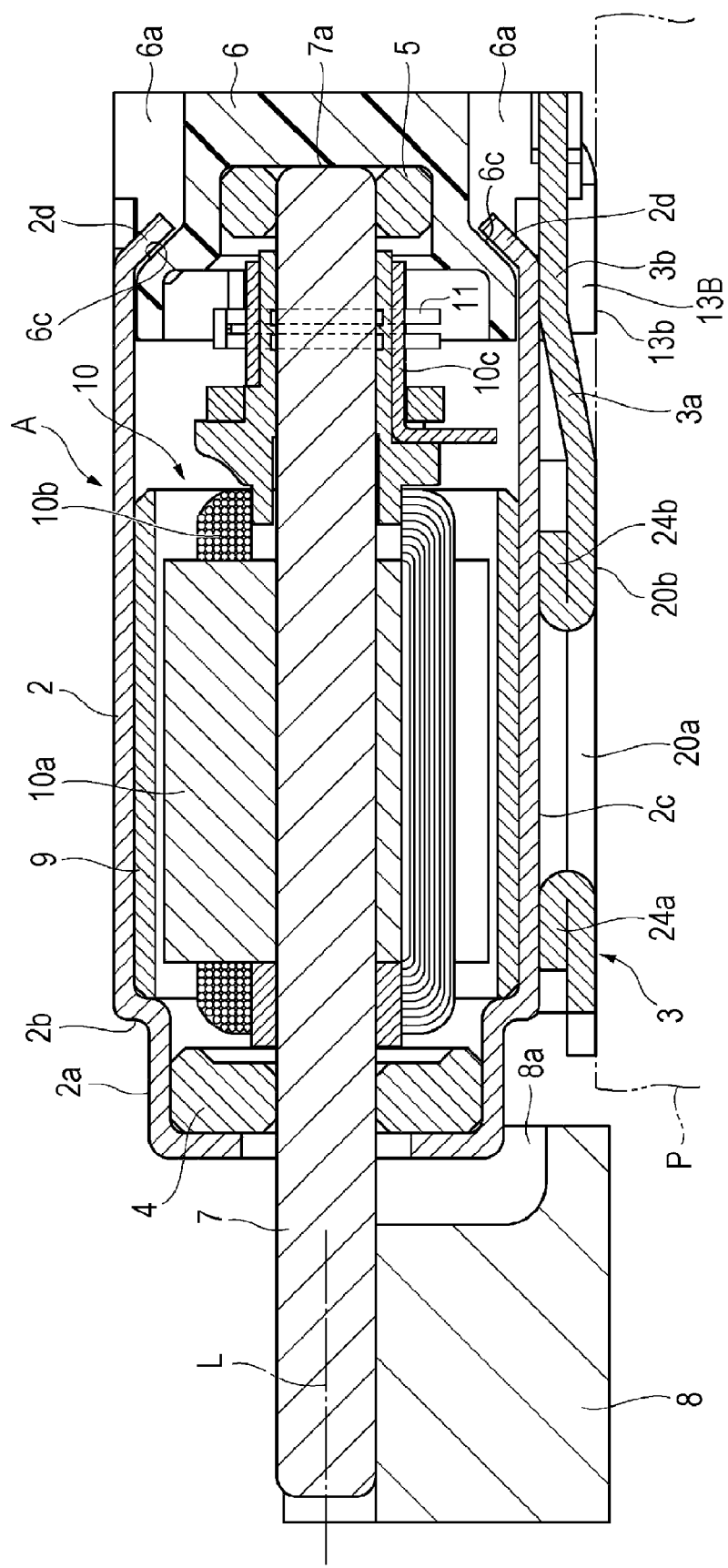
FIG. 1 is a sectional view of a surface mount motor according to an embodiment of the present invention.
Figure 2:
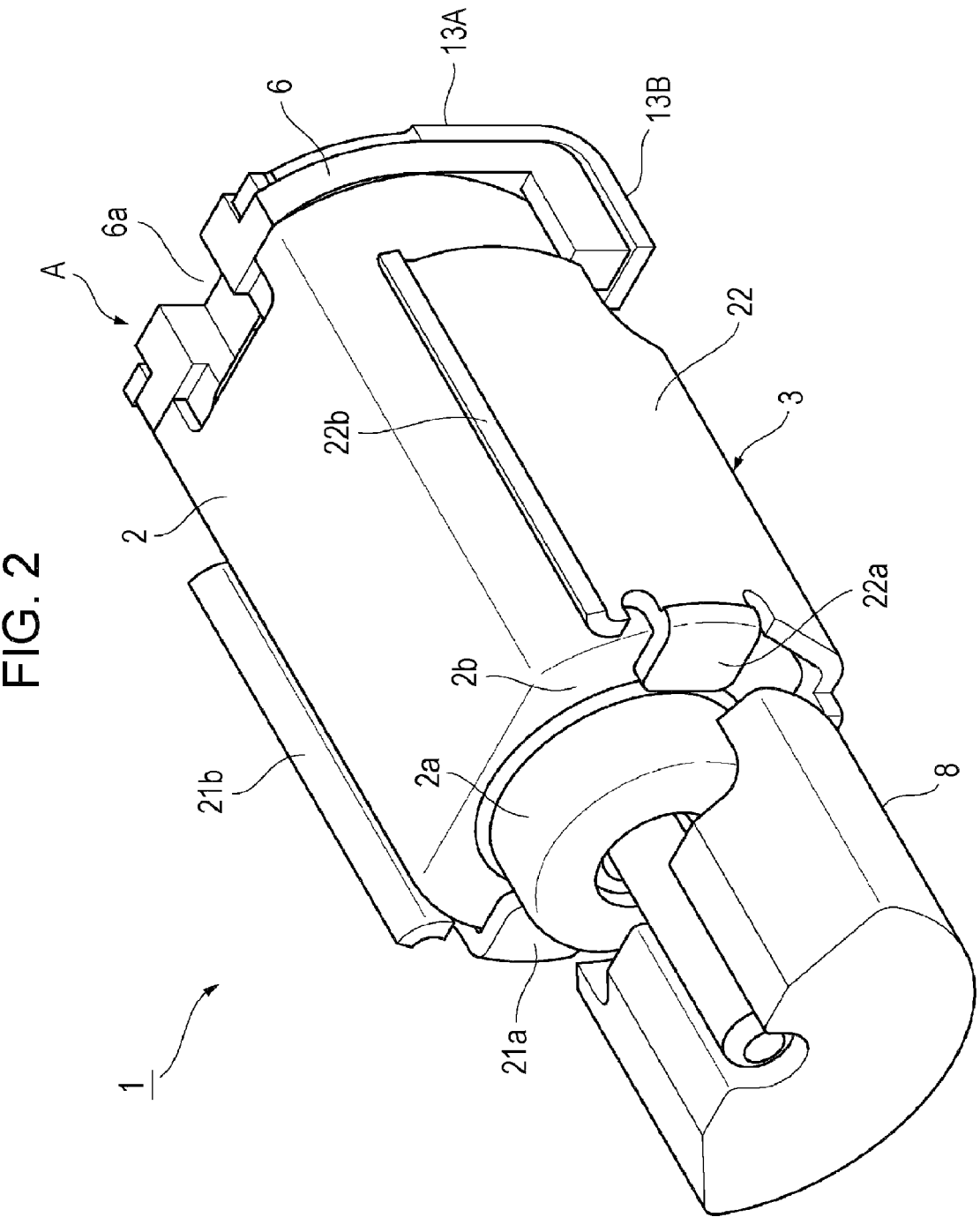
FIG. 2 is a perspective view of the motor illustrated in FIG. 1.
Figure 3:
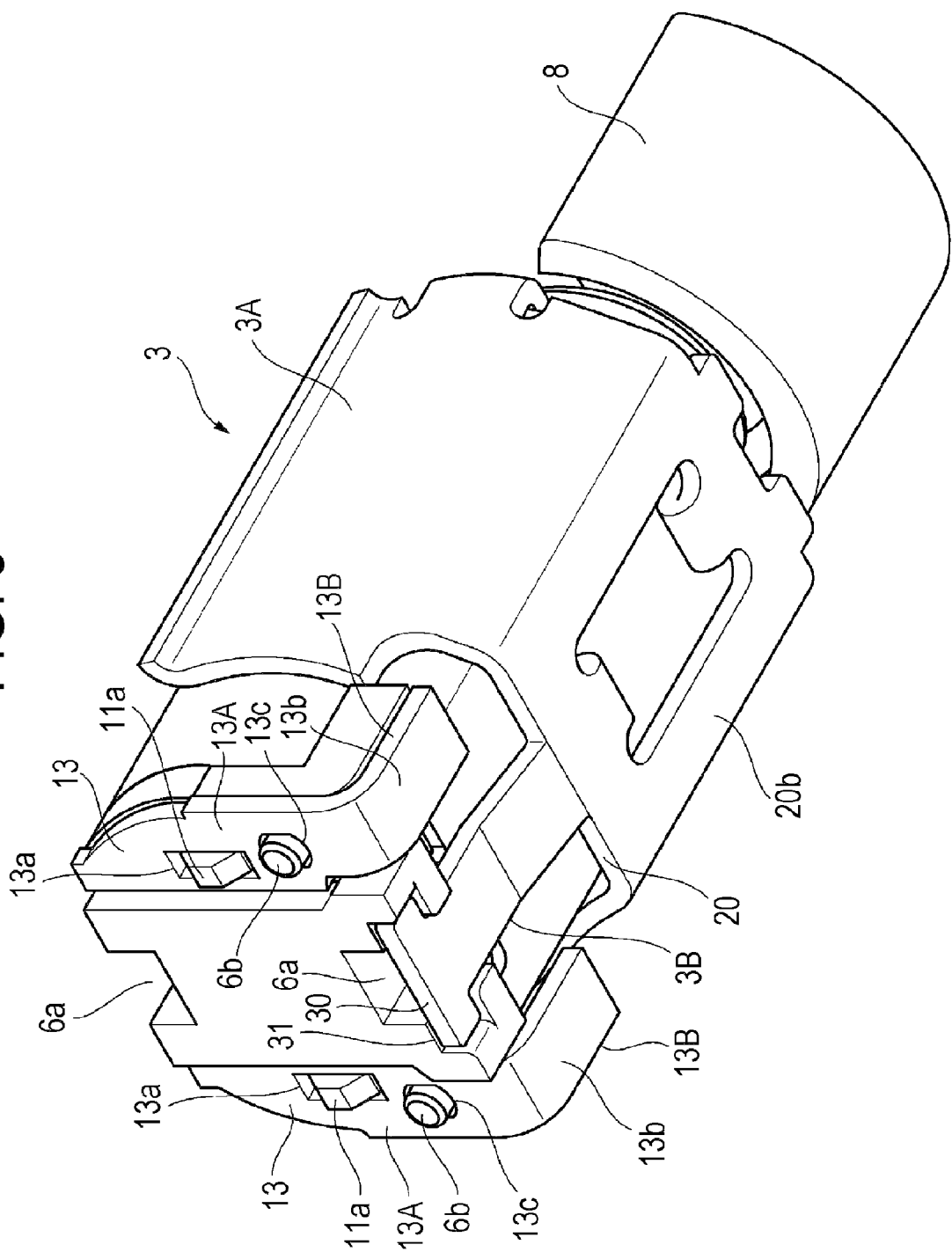
FIG. 3 is another perspective view of the motor illustrated in FIG. 1.

A surface mount motor according to an embodiment of the present invention will be described with reference to the drawings. In the following description, the side at which a weight is provided is defined as the "front side".

Referring to FIGS. 1 to 4, a surface mount motor 1 is a small vibration motor that is surface-mounted on a printed wiring board (circuit board) P by reflow soldering. The motor 1 includes a motor body A and a metal holder 3. The motor body A includes a motor casing 2 that has a tubular shape with a diameter of about 4 mm and a length of about 10 mm. The metal holder 3 is attached to the motor casing 2 of the motor body A such that the motor body A can be mounted on the printed wiring board P.

The motor casing 2 is made of a metal, and has a cylindrical shape or an oval shape in cross section. The motor casing 2 is open at the rear end thereof, and a bracket 6 made of resin is attached to the rear end of the motor casing 2. The motor casing 2 is provided with a neck portion 2a that projects from the front end of the motor casing 2 and that has a smaller diameter than that of the motor casing 2. A part of a shaft 7 projects from the front end of the neck portion 2a. A weight 8 having a semicircular shape in cross section is eccentrically fixed to an end portion of the shaft 7 by crimping or press-fitting. A recess 8a for receiving a part of the neck portion 2a is formed in the rear end surface of the weight 8.

The shaft 7 to which the weight 8 is fixed is supported by bearings 4 and 5. The bearing 4 is impregnated with oil and press-fitted into the neck portion 2a, and the bearing 5 is impregnated with oil and press-fitted into the bracket 6. When the shaft 7 rotates, a rear end 7a of the shaft 7 slides along an inner wall surface of the bracket 6. A pair of lugs 2d that project rearward are provided at the rear end of the motor casing 2 so as to face each other in the radial direction. Each lugs 2d is bent inward in the shape of a letter 'V' in a recess 6a formed in the bracket 6, and is pressed against an inclined front end surface 6c of the recess 6a in the bracket 6. Thus, the bracket 6 is fixed to the motor casing 2, and is prevented from being detached from the motor casing 2.

The motor casing 2 of the motor body A houses a stator 9 that is composed of a permanent magnet and bonded to an inner wall surface of the motor casing 2, and a rotor 10 that is surrounded by the stator 9 and fixed to the shaft 7. The rotor 10 includes a core 10a and a coil 10b wound around the core 10a, and the coil 10b is connected to a commutator piece 10c fixed to the shaft 7 at the rear end side of the motor casing 2. The commutator piece 10c rotates while sliding along a pair of brushes 11 that are fixed to the bracket 6.

The bracket 6 has through holes through which connection terminal pieces 11a provided on the brushes 11 project. A pair of terminals 13 that are bent in an L-shape are fixed to the bracket 6 at the left and right sides thereof. Each of the L-shaped terminals 13 includes a base portion 13A that is in contact with the rear end surface of the bracket 6 and a mounting portion 13B that is bent at a right angle with respect to the base portion 13A and is surface-mounted on the printed wiring board P with cream solder.

The connection terminal pieces 11a of the brushes 11 that project from the rear end surface of the bracket 6 project from first holes 13a formed in the base portions 13A of the terminals 13. The connection terminal pieces 11a of the brushes 11 that project from the base portions 13A of the terminals 13 are electrically connected to the base portions 13A with solder. Positioning pins 6b are provided on the rear end surface of the bracket 6 so as to project from second holes 13c formed in the base portions 13A of the terminals 13. Thus, the terminals 13 are positioned with respect to the bracket 6.

Figure 5:
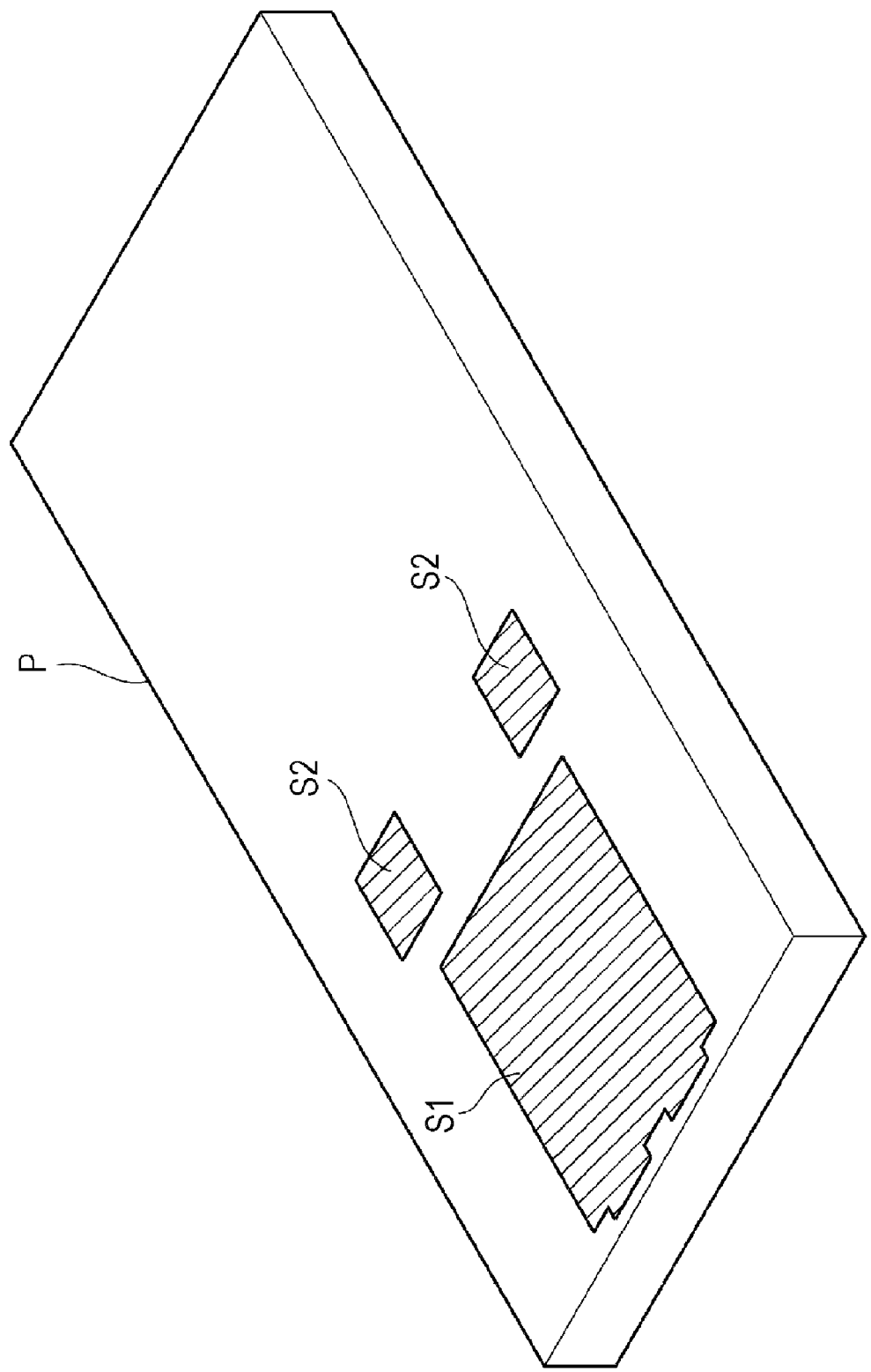
FIG. 5 is a perspective view of a printed wiring board.

Referring to FIG. 5, the printed wiring board (circuit board) P has a holder fixing pattern S1 and power supply patterns S2. A mounting surface 20b (see FIG. 3) of a bottom portion 20 of a holder body 3A of the holder 3 is mounted on the holder fixing pattern S1. The power supply patterns S2 are located behind the holder fixing pattern S1, and mounting surfaces 13b (see FIG. 3) of the mounting portions 13B of the terminals 13 at the left and right sides are placed on the power supply patterns S2.

Figure 6:
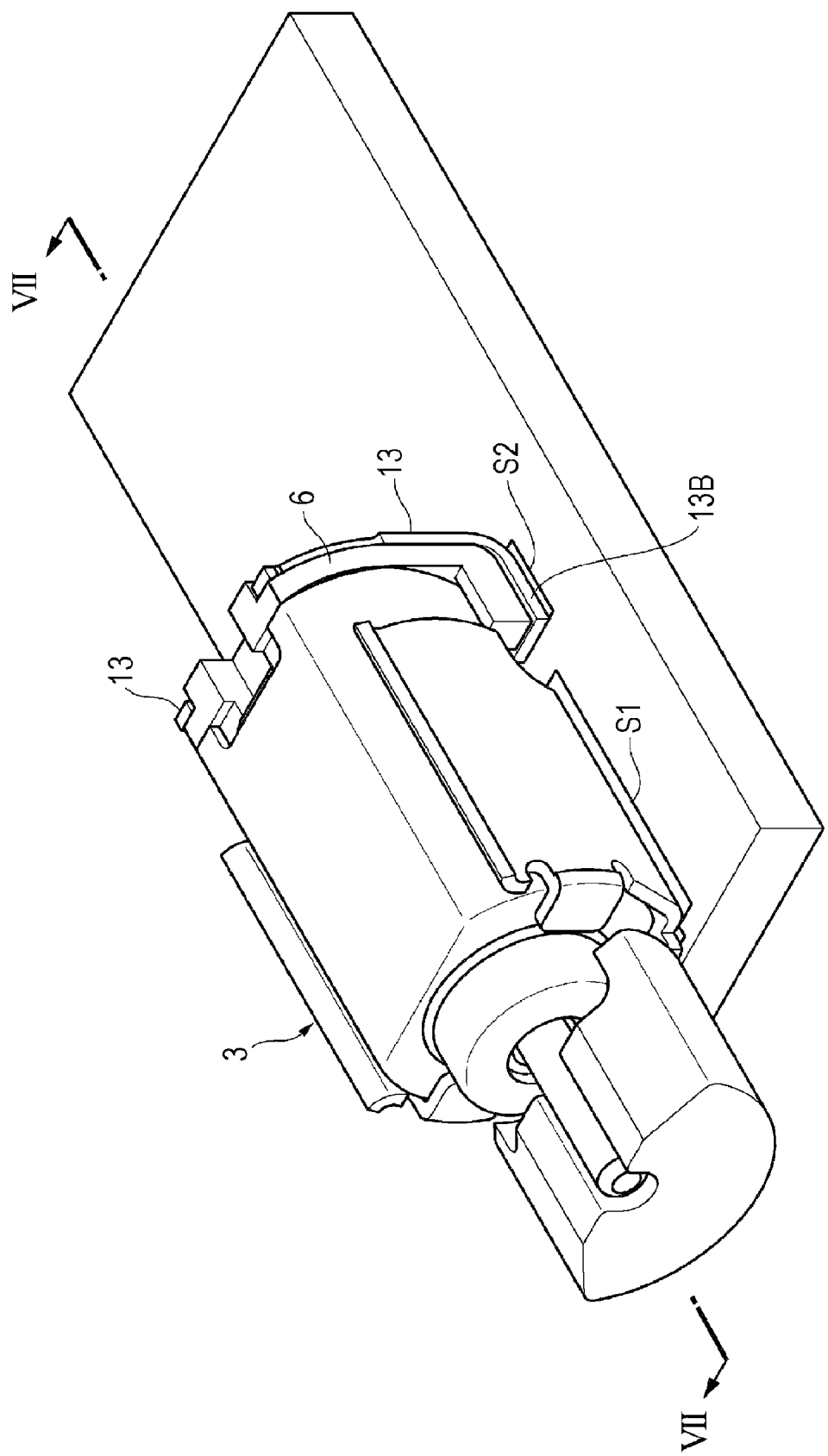
FIG. 6 is a perspective view illustrating the state in which the motor is mounted on the printed wiring board.
Figure 7:
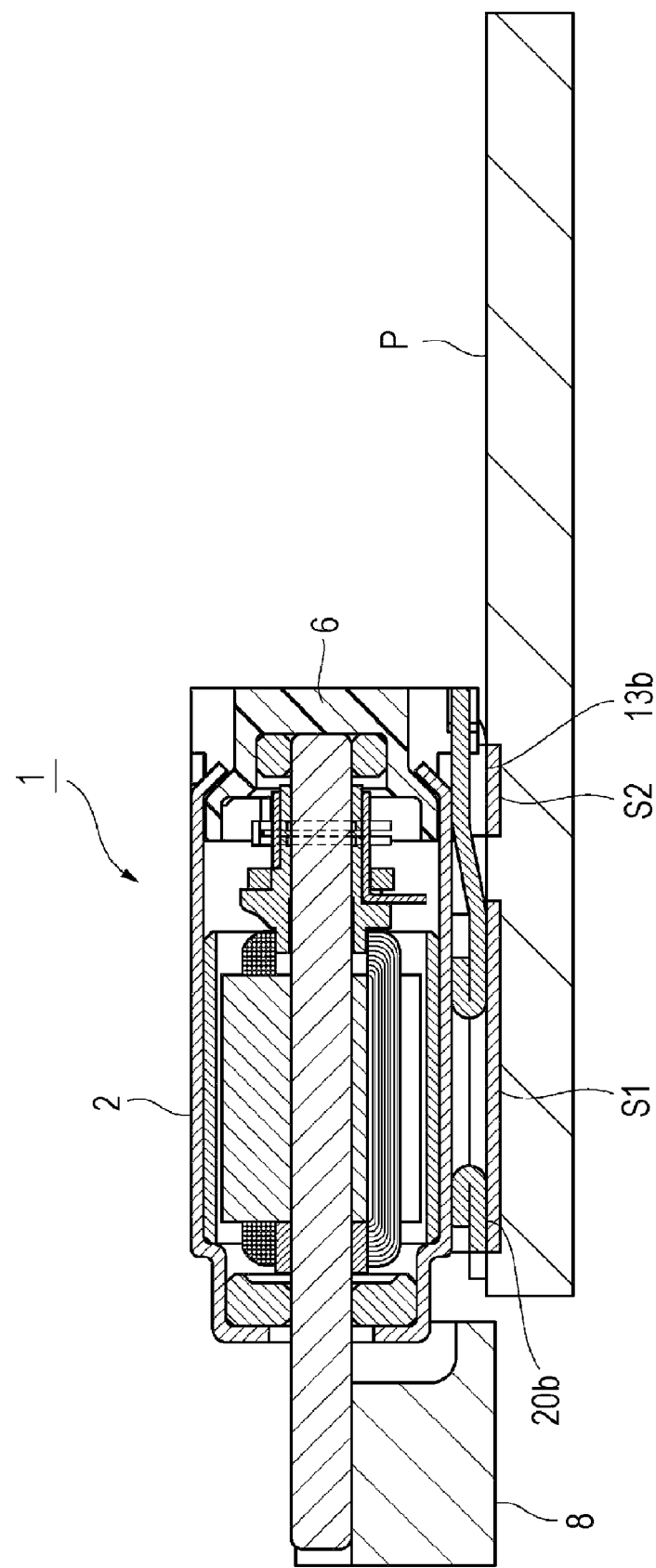
FIG. 7 is a sectional view of FIG. 6 taken along line VII-VII.
Figure 8:
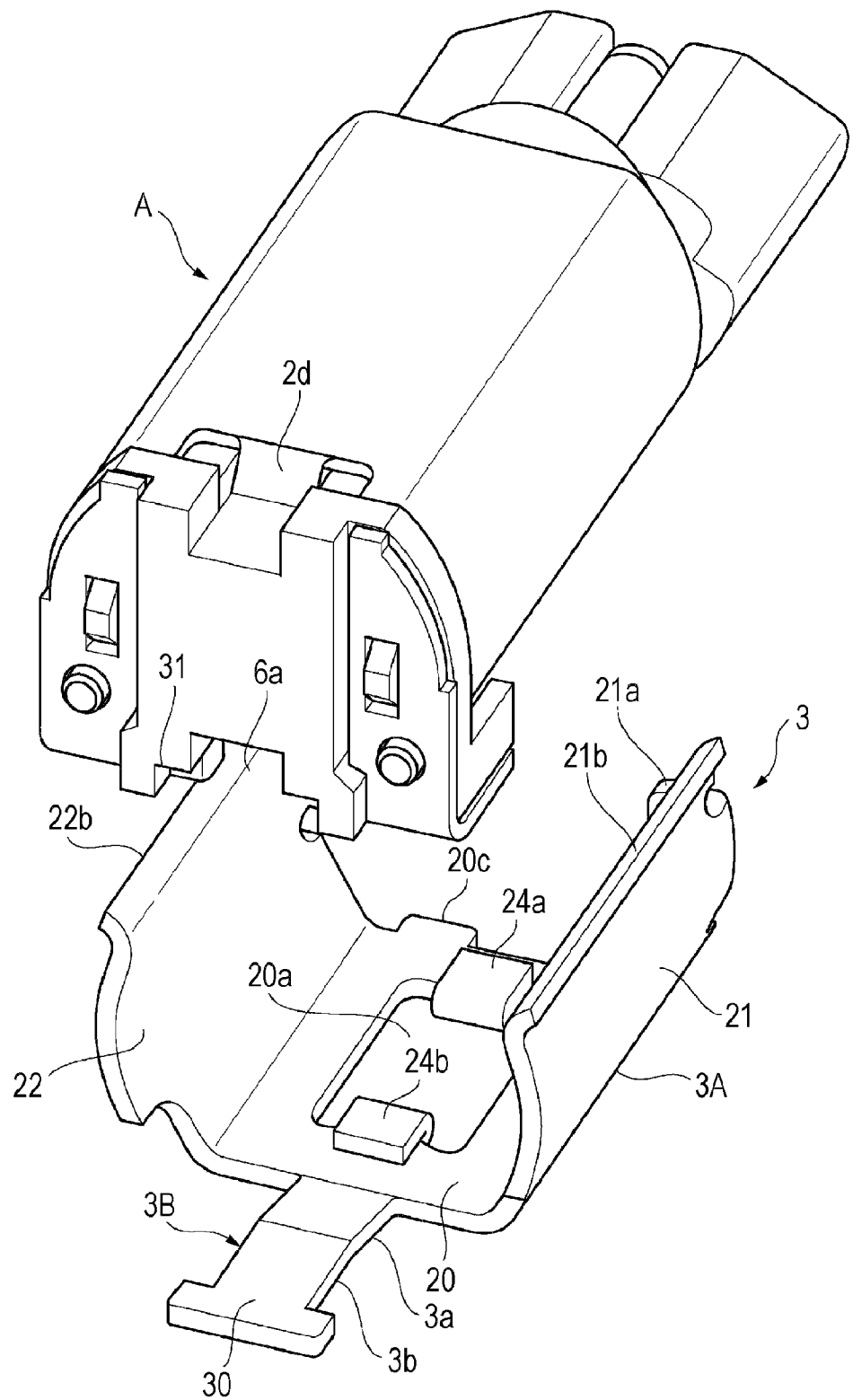
FIG. 8 is a perspective view illustrating the state before a motor body is assembled to a holder.
Figure 9:
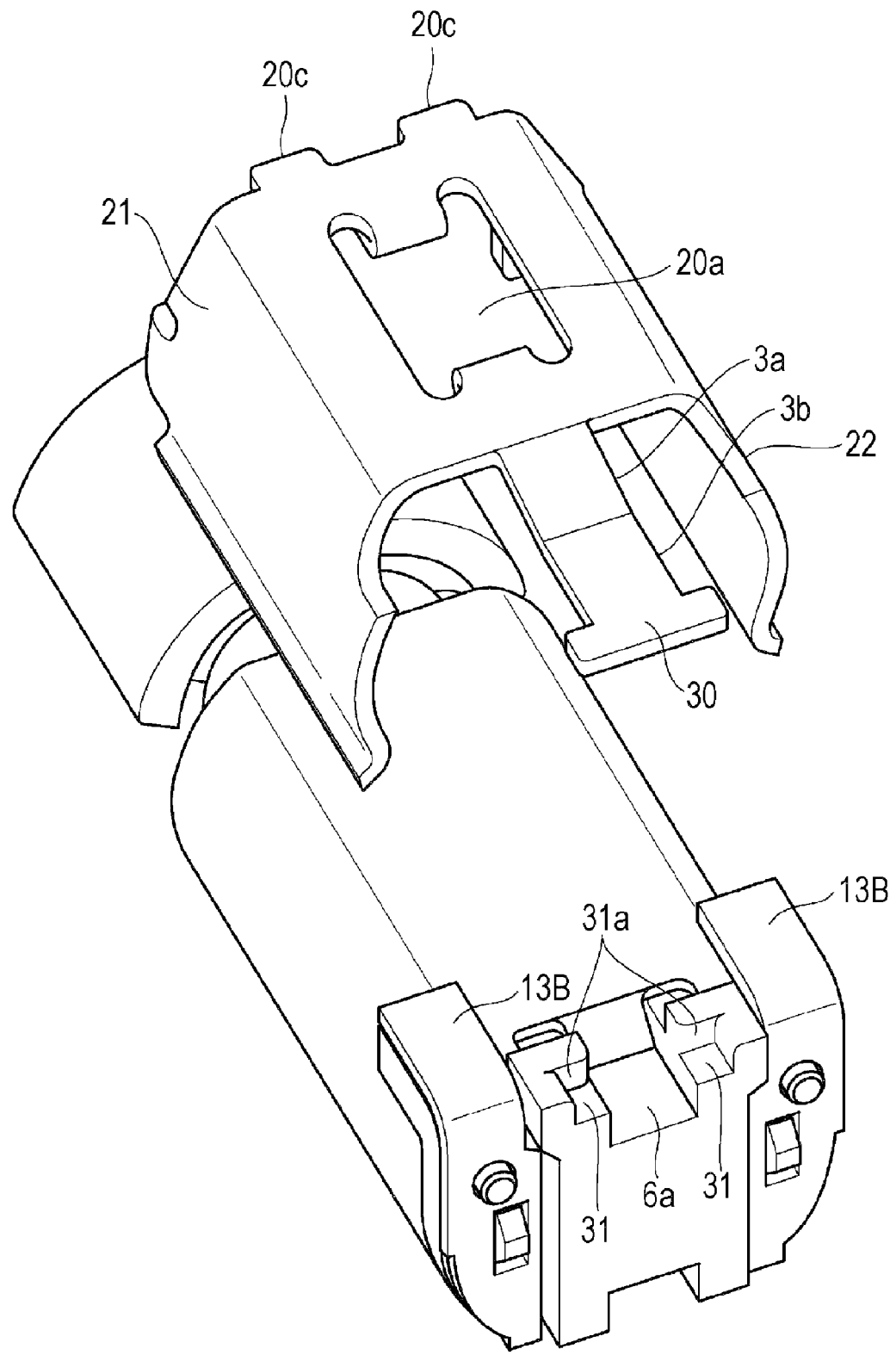
FIG. 9 is another perspective view illustrating the state before the motor body is assembled to the holder.
Figure 10:
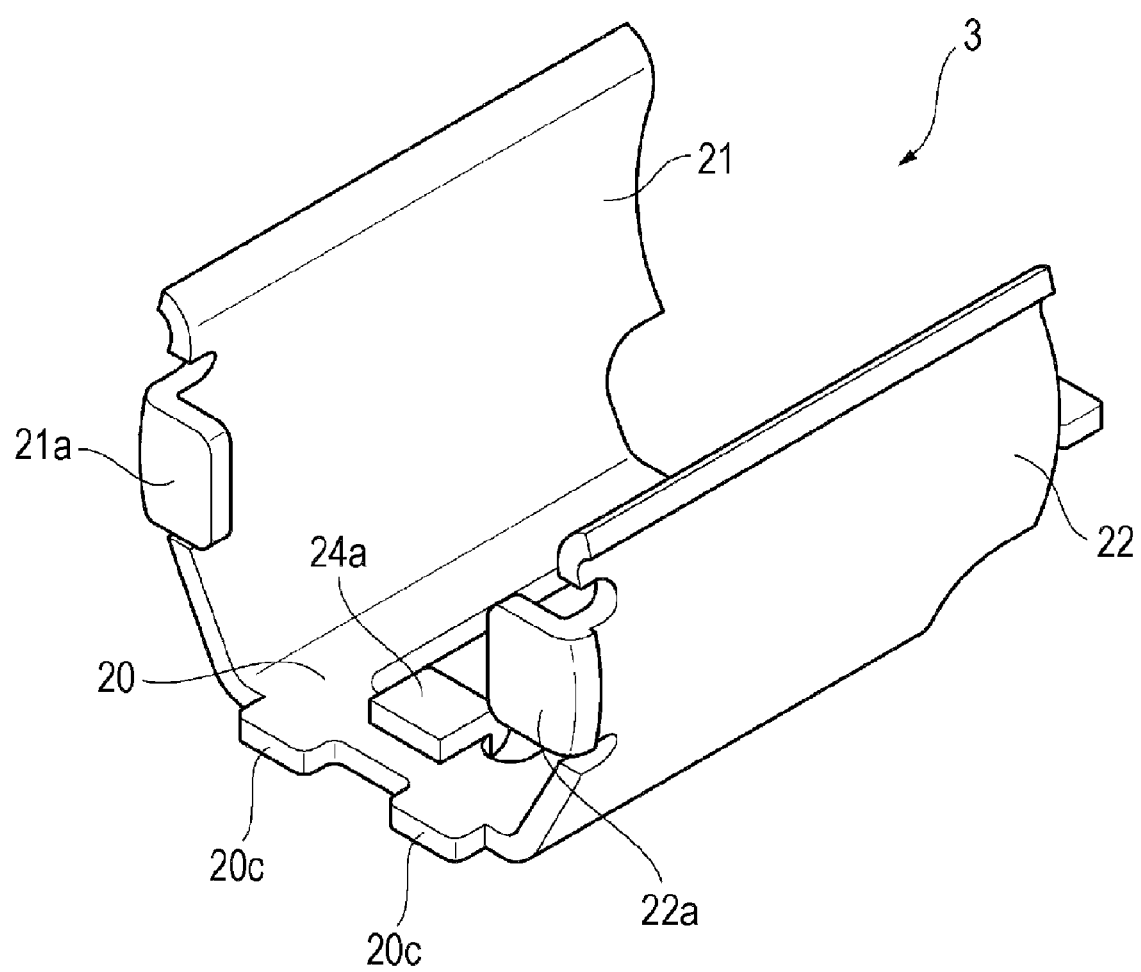
FIG. 10 is a perspective view of the holder.
Figure 11:
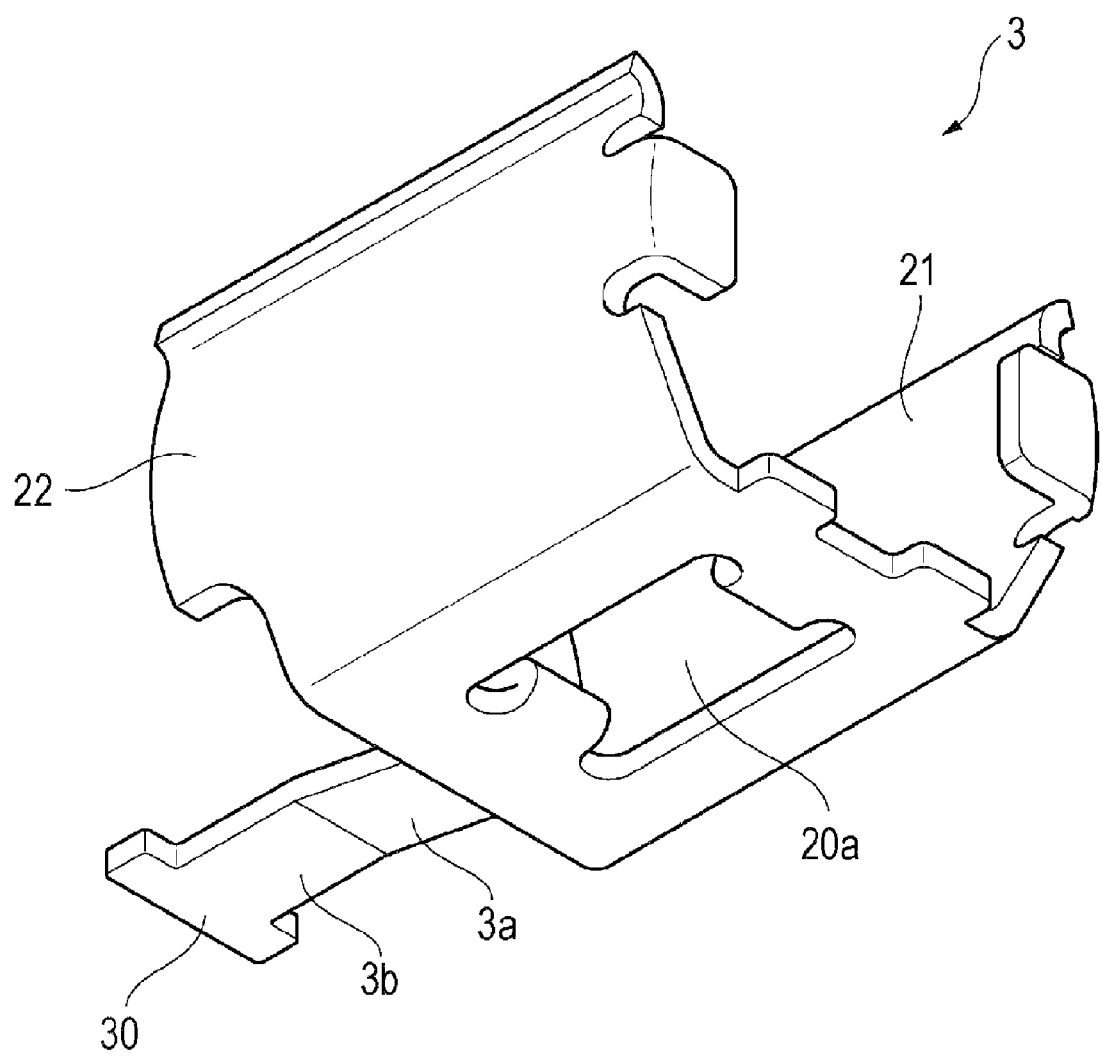
FIG. 11 is another perspective view of the holder.
Figure 12:
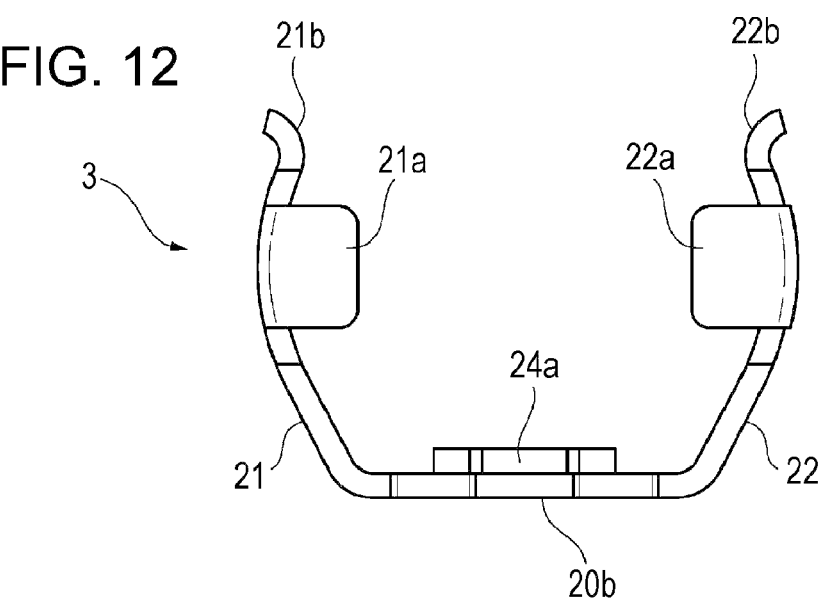
FIG. 12 is a front view of the holder.
Figure 13:
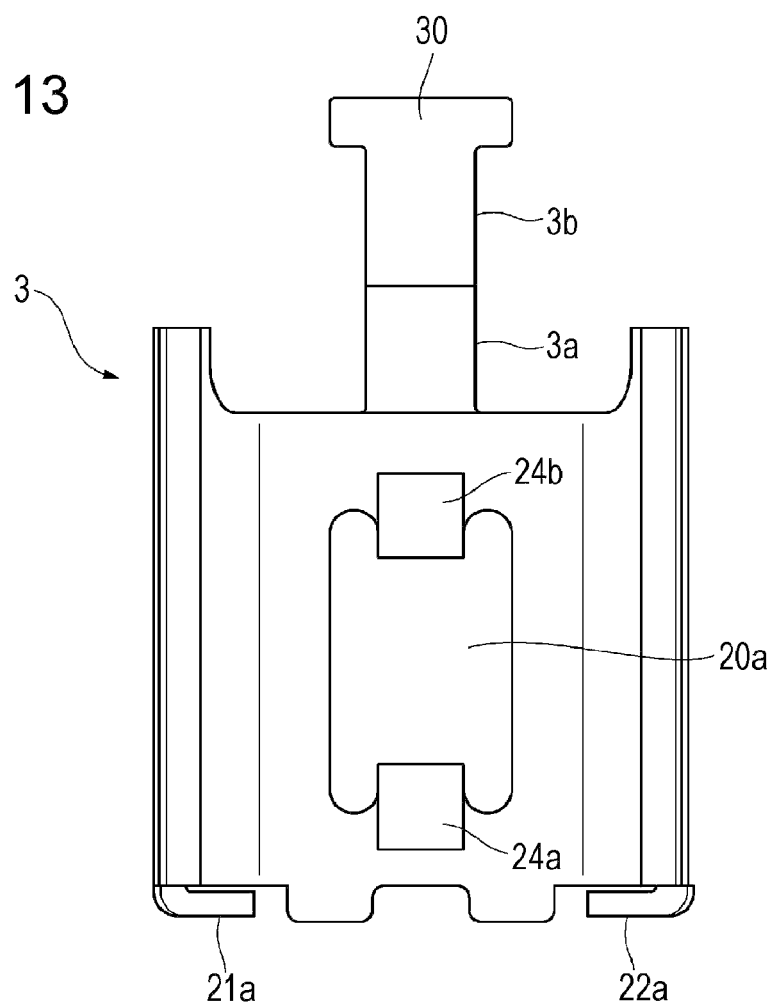
FIG. 13 is a plan view of the holder.

Referring to FIGS. 6 and 7, cream solder is applied to the holder fixing pattern S1 and the power supply patterns S2, and then a mounting device places the mounting surface 20b of the holder 3 on the holder fixing pattern S1 and the mounting surfaces 13b of the mounting portions 13B of the terminals 13 on the power supply patterns S2. Thus, the motor 1 is mounted on the printed wiring board P. In this state, the motor 1 and the printed wiring board P are placed in an electric furnace and the cream solder is melted. As a result, the mounting surface 20b of the holder 3 is integrated with the holder fixing pattern S1 by the solder, and the mounting portions 13B of the terminals 13 are integrated with the power supply patterns S2 by the solder.

The metal holder 3 to which the above-described motor body A is attached will now be described in detail.

Referring to FIGS. 8 to 13, the metal holder 3 has a thickness of 0.2 mm, and is formed by punching out a flat plate having a predetermined shape from a single stainless-steel plate and bending the flat plate.

The holder 3 includes a holder body 3A and an extending portion 3B that extends rearward from the rear end of the holder body 3A substantially in a direction of a rotational axis L. The holder body 3A includes the bottom portion 20 having a rectangular shape that is surface-mounted on the printed wiring board P with the cream solder and clamp pieces 21 and 22 having spring characteristics that extend upward from both sides of the bottom portion 20 in a curved shape. The bottom portion 20 has extension portions 20c that project from the front end of the bottom portion 20 in the direction of the rotational axis L.

The clamp pieces 21 and 22 are provided with lugs 21a and 22a, respectively, which are bent inward at the front ends of the clamp pieces 21 and 22. The lugs 21a and 22a extend toward the neck portion 2a of the motor casing 2 in a direction perpendicular to the rotational axis L. The lugs 21a and 22a are in contact with a step surface 2b (see FIG. 2) of the motor casing 2. Guide portions 21b and 22b that are bent outward are formed at the free ends of the clamp pieces 21 and 22, respectively, which are curved along the outer peripheral surface of the motor casing 2. The guide portions 21b and 22b are provided so that the clamp pieces 21 and 22 can be easily pushed away from each other when the motor casing 2 is pushed into the holder body 3A. Moreover, an adhesive can easily flow into gaps between the motor casing 2 and the clamp pieces 21 and 22 in the process of fixing the motor casing 2 to the holder 3 with the adhesive.

The bottom portion 20 of the holder 3 has a substantially rectangular opening 20a formed therein, and is provided with bottom-raising pieces 24a and 24b. The bottom-raising pieces 24a and 24b are initially formed so as to project into the opening 20a in the direction of the rotational axis L, and are outwardly folded onto the bottom portion 20. The bottom-raising pieces 24a and 24b are opposed to each other in the direction of the rotational axis L.

Referring to FIG. 1, the metal holder 3 that is in contact with a bottom surface 2c of the motor casing 2 has a thickness of 0.2 mm Accordingly, owing to the bottom-raising pieces 24a and 24b, the bottom surface 2c of the motor casing 2 can be separated from the mounting surface 20b of the bottom portion 20 by 0.4 mm Reduction in the size of the motor 1 and expansion of the terminals 13 can be achieved at the same time by reducing the gap between the terminals 13 and extending the terminals 13 to the motor casing 2. In this case, the mounting portions 13B of the terminals 13 are formed so as to project in the radial direction from the bottom end of the bracket 6 to prevent the mounting portions 13B from coming into contact with the motor casing 2. The mounting surface 20b of the holder 3 is located in the same plane as the mounting surfaces 13b of the mounting portions 13B of the terminals 13 that are fixed to the bracket 6.

The metal holder 3 having a thickness of 0.2 mm is formed by punching out a flat plate having a predetermined shape from a single stainless-steel plate and bending the flat plate. After the flat plate is punched out, the bottom-raising pieces 24a and 24b project into the opening 20a such that the bottom-raising pieces 24a and 24b are parallel to the bottom portion 20. Then, the bottom-raising pieces 24a and 24b are bent by a bending angle α of 180° with respect to the bottom portion 20 (see FIG. 14).

Figure 4:
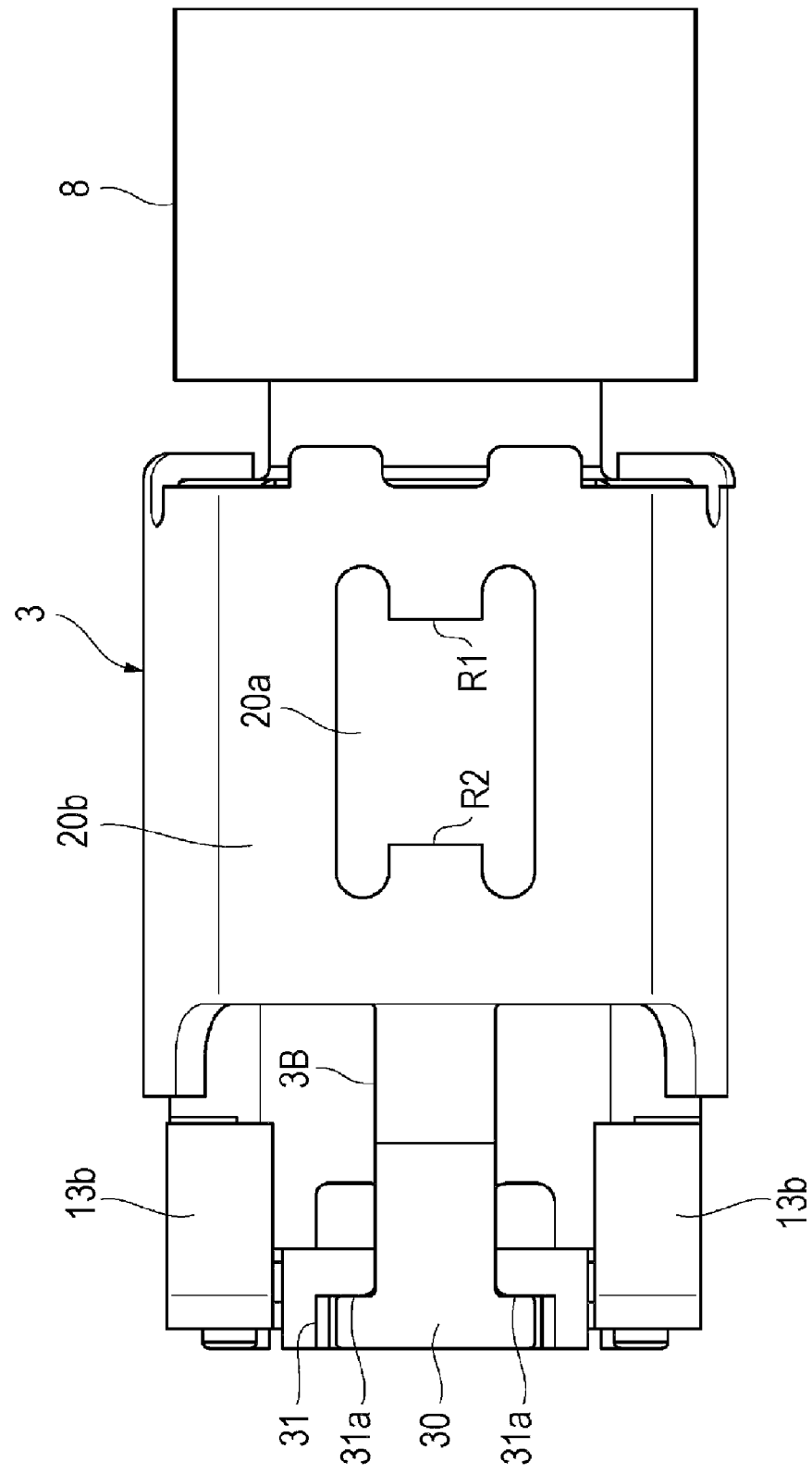
FIG. 4 is a bottom view of the motor illustrated in FIG. 1.
Figure 14:
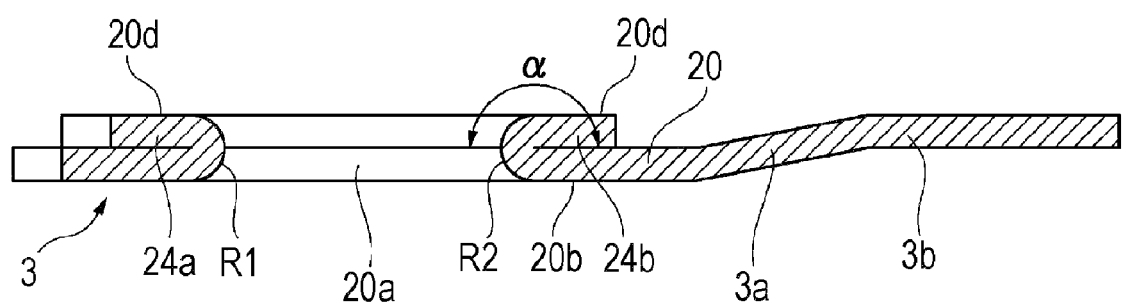
FIG. 14 is a sectional view of the holder.

Of the bottom-raising pieces 24a and 24b that are bent in the above-described manner, the bottom-raising piece 24a at the front is located near the weight 8. Therefore, the bottom-raising piece 24a contributes to supporting the weight 8 and ensures the rotational stability of the weight 8. As illustrated in FIGS. 4 and 14, the bottom-raising pieces 24a and 24b are bent such that bent portions R1 and R2 project into the opening 20a (from side end surface of the opening side of the bottom portion 20). Owing to the bent portions R1 and R2, the contour line of the opening 20a is longer than that in the case in which the opening 20a has a precisely rectangular shape. Since the length of the contour line of the opening 20a is increased, the amount of cream solder applied to the contour of the opening 20a is increased accordingly. As a result, the holder 3 is securely fixed to the printed wiring board P.

The holder 3 of the surface mount motor 1 includes the bottom-raising pieces 24a and 24b formed so as to extend integrally from the bottom portion 20. The bottom-raising pieces 24a and 24b are bent by a predetermined bending angle α with respect to the bottom portion 20. When the holder 3 is attached to the motor body A, there is a risk that the mounting surface 20b of the bottom portion 20 of the holder 3 will not be in the same plane as the mounting surfaces 13b of the terminals 13. In such a case, a fine adjustment may be performed simply by slightly raising or lowering the bottom-raising pieces 24a and 24b. Thus, an adjustment between the heights of the mounting surface 20b of the bottom portion 20 of the holder 3 and the mounting surfaces 13b of the terminals 13 can be easily performed.

The gap (raising amount) between the bottom portion 20 of the holder 3 and the motor casing 2 can be easily changed simply by changing the bending angle α of the bottom-raising pieces 24a and 24b. In the case where the weight 8 is provided on the shaft 7 in the motor body A, the weight 8 may be arranged so as not to interfere with the printed wiring board P when the weight 8 rotates. In such a case, it is necessary to increase the raising amount of the motor casing 2. Also in this case, the raising amount can be easily increased by changing the bending angle α of the bottom-raising pieces 24a and 24b. The bottom-raising pieces 24a and 24b can be easily formed by a bending process.

When the bending angle α is set to 180°, placement surfaces 20d (see FIG. 14) for receiving the motor casing 2 may be formed on the bottom-raising pieces 24a and 24b such that the placement surfaces 20d are parallel to the mounting surface 20b of the bottom portion 20. Since the placement surfaces 20d come into surface contact with the motor casing 2, the motor body A can be stably placed on the holder 3.

When the bottom-raising pieces 24a and 24b are folded onto the bottom portion 20, the raising amount of the motor casing 2 can be set to twice the thickness of the bottom portion 20. Thus, differences between the raising amounts of holders can be reduced and the raising amounts can be easily set to a uniform value. In addition, the cream solder in a molten state enters the opening 20a, so that the holder 3 is not easily detached from the printed wiring board P.

As illustrated in FIGS. 8 to 13, the holder 3 is provided with the extending portion 3B that extends rearward from the rear end of the holder body 3A substantially in the direction of the rotational axis L. The extending portion 3B extends from the rear end of the holder body 3A toward the bracket 6, and has a certain width. The extending portion 3B is provided with a stopper portion 30 that extends in the width direction (direction orthogonal to the rotational axis L) at the rear end of the extending portion 3B. The stopper portion 30 extends in the shape of a letter 'T' in the direction orthogonal to the rotational axis L.

The resin bracket 6 has recesses 31 between the mounting portions 13B of the terminals 13. The stopper portion 30 is press-fitted into the recesses 31. The recesses 31 are formed so as to extend outward in the width direction (direction orthogonal to the rotational axis L) at the rear end side of one of the recesses 6a, and front wall surfaces 31a of the recesses 31 are in pressure contact with the stopper portion 30 (see FIG. 4). Thus, the holder 3 reliably prevents the bracket 6 from being pulled out in the direction of the rotational axis L. After the stopper portion 30 of the extending portion 3B is press-fitted into the recesses 31, the adhesive is injected into the gaps between the motor casing 2 and the clamp pieces 21 and 22. Thus, the motor casing 2 is fixed to the holder 3 with the adhesive. Accordingly, the bracket 6 is securely retained in the direction of the rotational axis L by the extending portion 3B.

The extending portion 3B is not in contact with the printed wiring board P. A front part 3a of the extending portion 3B is inclined with respect to the mounting surface 20b of the holder body 3A such that the front part 3a approaches the motor casing 2 as the distance from the holder body 3A increases. A rear part 3b of the extending portion 3B extends along the motor casing 2 and is in contact with the motor casing 2 (see FIG. 1). Since the front part 3a of the extending portion 3B is inclined, the rear part 3b of the extending portion 3B is easily set to a state in which the rear part 3b is raised by a distance of 0.2 mm, which is equivalent to the thickness of the holder 3, from the printed wiring board P.

In the above-described structure, the extending portion 3B is not in contact with the printed wiring board P. Thus, the rear part 3b of the extending portion 3B can be stably placed on the motor casing 2. Accordingly, the stopper portion 30 of the extending portion 3B can be easily press-fitted into the recesses 31 in the bracket 6.

The extending portion 3B is connected to the holder body 3A that is mounted on the printed wiring board P. Therefore, the cream solder applied between the printed wiring board P and the holder 3 easily flows along the extending portion 3B. Since the extending portion 3B is not in contact with the printed wiring board P, excess solder can be easily collected in the space between the extending portion 3B and the printed wiring board P when the cream solder is melted in the electric furnace.

The terminals 13 are mounted on the printed wiring board P with solder. The terminals 13 have small mounting surfaces. Therefore, when, for example, an impact is applied to the bracket 6 and the bracket 6 is detached from the motor casing 2, the terminals 13 are easily detached from the printed wiring board P. In such a case, it becomes impossible to supply electricity to the motor 1. In particular, in the case where the weight 8 is attached to the shaft 7 of the motor 1, if the motor 1 is dropped, there is a high possibility that the shaft 7 will be suddenly shifted in the direction of the rotational axis (thrust direction). When the rear end 7a of the shaft 7 strongly hits the bracket 6 as a result of the movement of the shaft 7, the terminals 13 easily become detached from the motor casing 2.

To reduce such a risk, the stopper portion 30 is press-fitted into the recesses 31 formed in the bracket 6, the stopper portion 30 extending in the width direction at the rear end of the extending portion 3B that extends rearward from the rear end of the holder body 3A substantially in the direction of the rotational axis L. Accordingly, even when the bracket 6 is fixed to the motor casing 2 using only the lugs 2d without performing welding or applying an adhesive, the bracket 6 can be reliably prevented from being pulled out in the direction of the rotational axis L. Thus, the bracket 6 is not easily detached from the motor casing 2. As a result, the terminals 13 are not easily separated from the printed wiring board P. The extending portion 3B may be formed to be flat over the entire area thereof.

The present invention is, of course, not limited to the above-described embodiment. For example, the bottom-raising pieces 24a and 24b are not particularly limited as long as they are bent and the bending angle α is in the range of $0°<\alpha\leq180°$. When the bottom-raising pieces 24a and 24b are folded twice at a bending angle α of 180°, a raising amount of 0.6 mm may be reliably obtained. Therefore, the required raising amount can be easily and reliably obtained by folding the bottom-raising pieces 24a and 24b appropriate number of times.

Figure 15A:
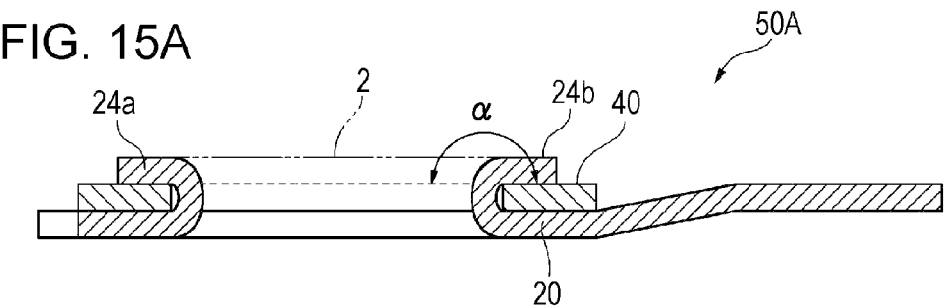
FIGS. 15A to 15C are diagrams illustrating holders according to modifications.

As illustrated in FIG. 15A, an annular spacer 40 may be provided on the bottom portion 20 of a holder 50A, and the bottom-raising pieces 24a and 24b may be bent at a bending angle α of 180° such that the spacer 40 is placed between the bottom portion 20 and the bottom-raising pieces 24a and 24b. In this structure, the raising amount of the motor casing 2 can be easily changed simply by changing the thickness of the spacer 40.

Figure 15B:
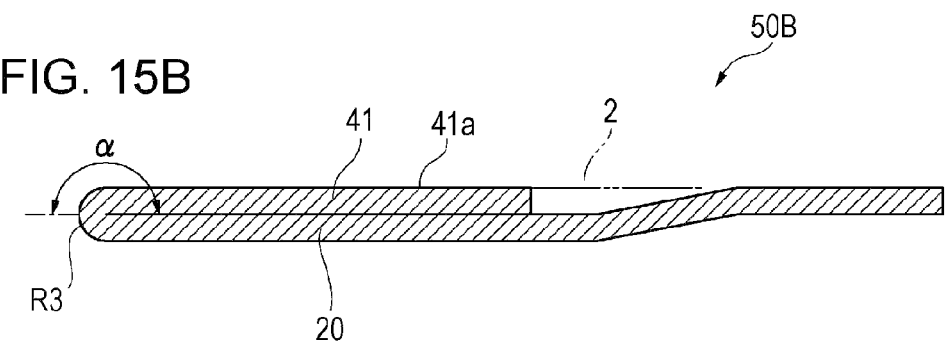
Figure 15C:
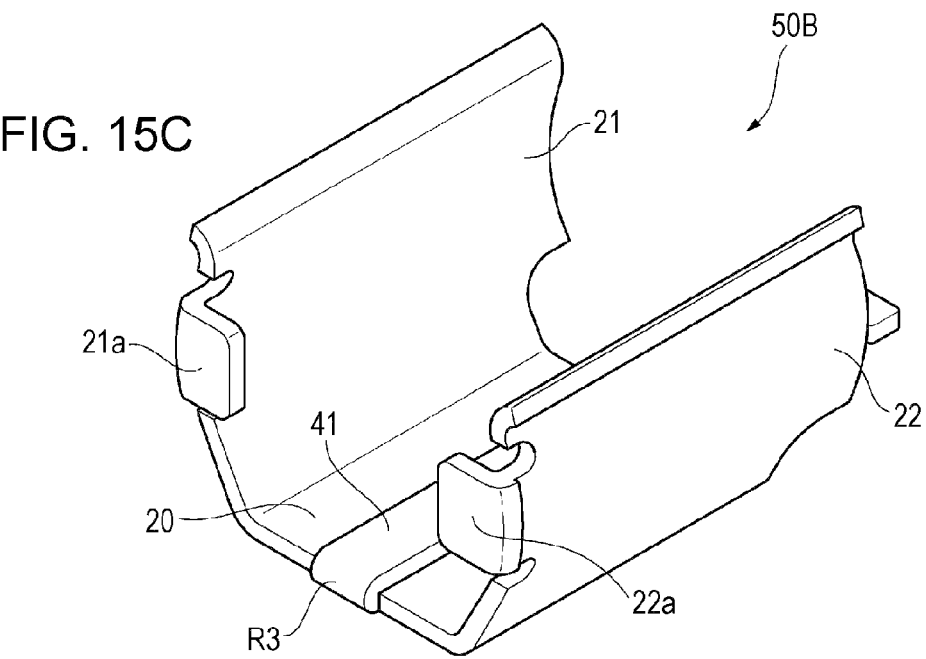

Referring to FIGS. 15B and 15C, a holder 50B is provided with an elongate bottom-raising piece 41 that projects forward from the front edge of the bottom portion 20 at the center thereof. The bottom-raising piece 41 is folded at a bending angle α of 180° such that a bent portion R3 projects from the side end surface of front side of the bottom portion 20. The motor casing 2 is placed on the bottom-raising piece 41. The bottom-raising piece 41 extends in a longitudinal direction of the motor casing 2, and a placement surface 41a of the bottom-raising piece 41 extends rearward from a position near the weight 8. Thus, the placement area is increased. In addition, since the bottom-raising piece 41 includes the bent portion R3 at the front end of the bottom portion 20, the bottom-raising piece 41 contributes to supporting the weight 8 and ensures the rotational stability of the weight 8. Also in this case, the opening 20a may be formed in the bottom portion 20 of the holder 3. However, it is not necessary to form the opening 20a.

Figure 16A:
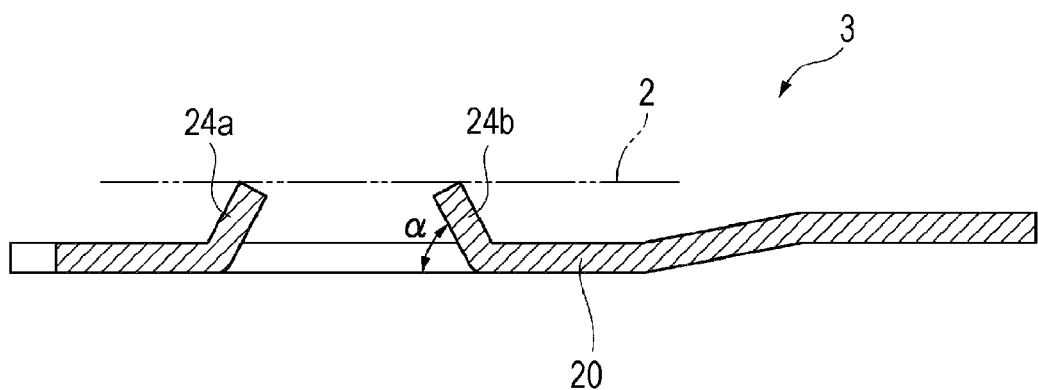
FIGS. 16A and 16B are sectional views of holders according to another modification.
Figure 16B:
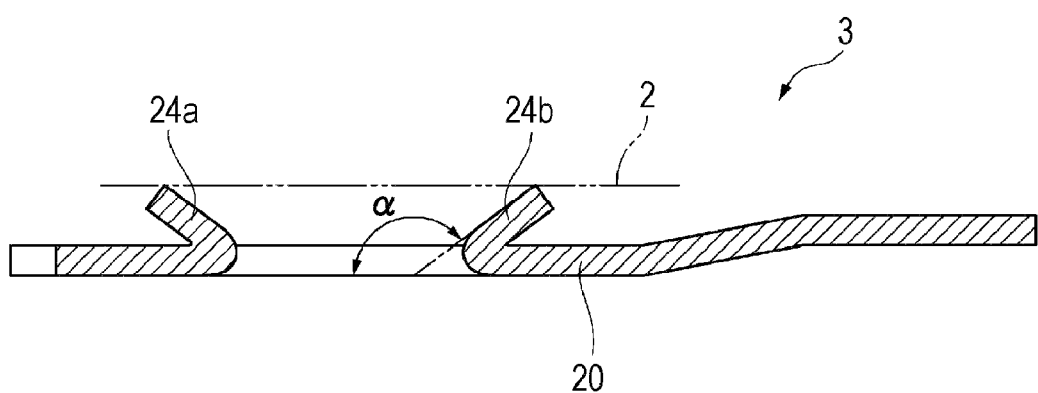

The bending angle α of the bottom-raising pieces 24a and 24b of the holder 3 may be in the range of $0°<\alpha\leq90°$, as illustrated in FIG. 16A. Alternatively, the bending angle α may be in the range of $90°<\alpha\leq180°$, as illustrated in FIG. 16B. When the bottom-raising pieces 24a and 24b are bent in this manner, the gap (raising amount) between the bottom portion 20 of the holder 3 and the motor casing 2 may be easily changed simply by changing the bending angle α of the bottom-raising pieces 24a and 24b.

What is claimed is:

1. A surface mount motor, comprising:
   a motor body including a tubular motor casing;
   a terminal provided on the motor body, the terminal being mounted on a circuit board; and
   a holder attached to the motor casing of the motor body, wherein the holder includes:
   a bottom portion mounted on the circuit board, and
   a bottom-raising piece formed so as to extend integrally from the bottom portion, the bottom-raising piece being bent at a predetermined bending angle of about 180° with respect to the bottom portion so as to form a substantially flat placement surface to receive the motor casing and be in surface contact therewith.

2. The surface mount motor according to claim 1, wherein the bottom portion has an opening, and the bottom-raising piece is initially formed so as to project into the opening and is bent onto the bottom portion.

3. The surface mount motor according to claim 1, wherein the bottom-raising piece includes a bent portion projecting from the bottom portion in a direction in which the bottom portion extends.

4. The surface mount motor according to claim 1, wherein the bottom portion has an opening, and the bottom-raising piece includes a bent portion projecting into the opening from an edge of the opening so as to increase a counter line of the opening.

5. The surface mount motor according to claim 1, wherein the holder further includes:
   a pair of clamping pieces each extending upwardly from the bottom portion and having a free end, wherein a top surface of the motor casing being exposed though an opening formed between the free ends.

* * * * *